United States Patent
Blanchard et al.

(10) Patent No.: US 11,378,014 B2
(45) Date of Patent: Jul. 5, 2022

(54) TORQUE TRANSMISSION DEVICE WITH REDUCED FRICTION

(71) Applicant: SAFRAN AIRCRAFT ENGINES, Paris (FR)

(72) Inventors: Stéphane Pierre Guillaume Blanchard, Moissy-Cramayel (FR); Helene Myriam Condat, Moissy-Cramayel (FR); Nicolas Xavier Trappier, Moissy-Cramayel (FR); Laurent Paul François Perrot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 19 days.

(21) Appl. No.: 17/055,428

(22) PCT Filed: May 15, 2019

(86) PCT No.: PCT/FR2019/051098
§ 371 (c)(1),
(2) Date: Nov. 13, 2020

(87) PCT Pub. No.: WO2019/220053
PCT Pub. Date: Nov. 21, 2019

(65) Prior Publication Data
US 2021/0189972 A1  Jun. 24, 2021

(30) Foreign Application Priority Data
May 15, 2018 (FR) ........................................ 1854044

(51) Int. Cl.
*F02C 7/36* (2006.01)
*F16D 3/06* (2006.01)
*F16D 1/10* (2006.01)

(52) U.S. Cl.
CPC ................ *F02C 7/36* (2013.01); *F16D 3/065* (2013.01); *F05D 2240/60* (2013.01); *F05D 2250/294* (2013.01); *F16D 2001/103* (2013.01)

(58) Field of Classification Search
CPC ...... F02C 7/36; F16D 3/065; F16D 2001/103; F05D 2240/60; F05D 2250/294;
(Continued)

(56) References Cited

U.S. PATENT DOCUMENTS 3,203,202 A * 8/1965 Brownyer ............... F16C 3/035
464/167
6,217,456 B1 * 4/2001 Jacob ...................... F16C 3/035
464/167
(Continued)

FOREIGN PATENT DOCUMENTS

DE  10 2005 048 982 A1  4/2007
EP      3 020 991 A1     5/2016
(Continued)

*Primary Examiner* — J. Todd Newton, Esq.
(74) *Attorney, Agent, or Firm* — Sughrue Mion, PLLC

(57) ABSTRACT

A turbomachine includes a low-pressure shaft that drives a fan shaft in rotation by a coupling assembly including a first shaft on which are formed plural first axial grooves, a second shaft on which are formed plural second axial grooves, and a coupling device including rolling elements and an annular cage positioned between the first shaft and the second shaft. The rolling elements are positioned between one of the first axial grooves and one of the second axial grooves to couple in rotation the first and the second shaft. Each first and second groove has a first and a second substantially planar surface inclined with respect to one another and extending along the axis.

11 Claims, 8 Drawing Sheets

(58) Field of Classification Search
CPC ........... F05D 2250/241; F05D 2260/38; F05D 2260/403; F01D 5/026; F16C 35/0635; F16C 3/03; F16C 3/035; F16C 29/0692; F16C 29/0695
USPC ........................................ 415/122.1; 384/516
See application file for complete search history.

(56) References Cited

U.S. PATENT DOCUMENTS

| | | | |
|---|---|---|---|
| 6,510,756 B2* | 1/2003 | Aota | B62D 1/192 |
| | | | 280/777 |
| 8,449,243 B2 | 5/2013 | Fiala et al. | |
| 9,958,015 B2* | 5/2018 | Mondragon | F16D 3/065 |
| 2015/0084340 A1 | 3/2015 | Kuczaj et al. | |
| 2016/0131196 A1* | 5/2016 | Miyawaki | F16C 3/035 |
| | | | 464/167 |
| 2021/0189972 A1* | 6/2021 | Blanchard | F01D 5/026 |

FOREIGN PATENT DOCUMENTS

| | | |
|---|---|---|
| EP | 3 121 469 A1 | 1/2017 |
| FR | 1373752 A | 10/1964 |
| GB | 1372402 A | 10/1974 |
| WO | 2006/048029 A1 | 5/2006 |

* cited by examiner

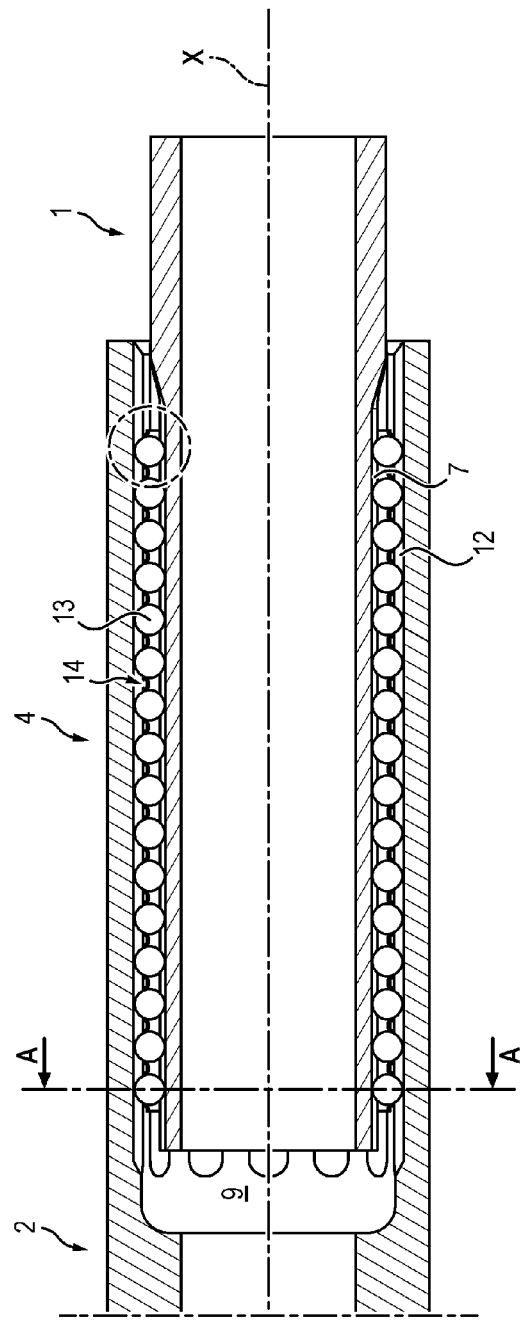

A-A cross-section

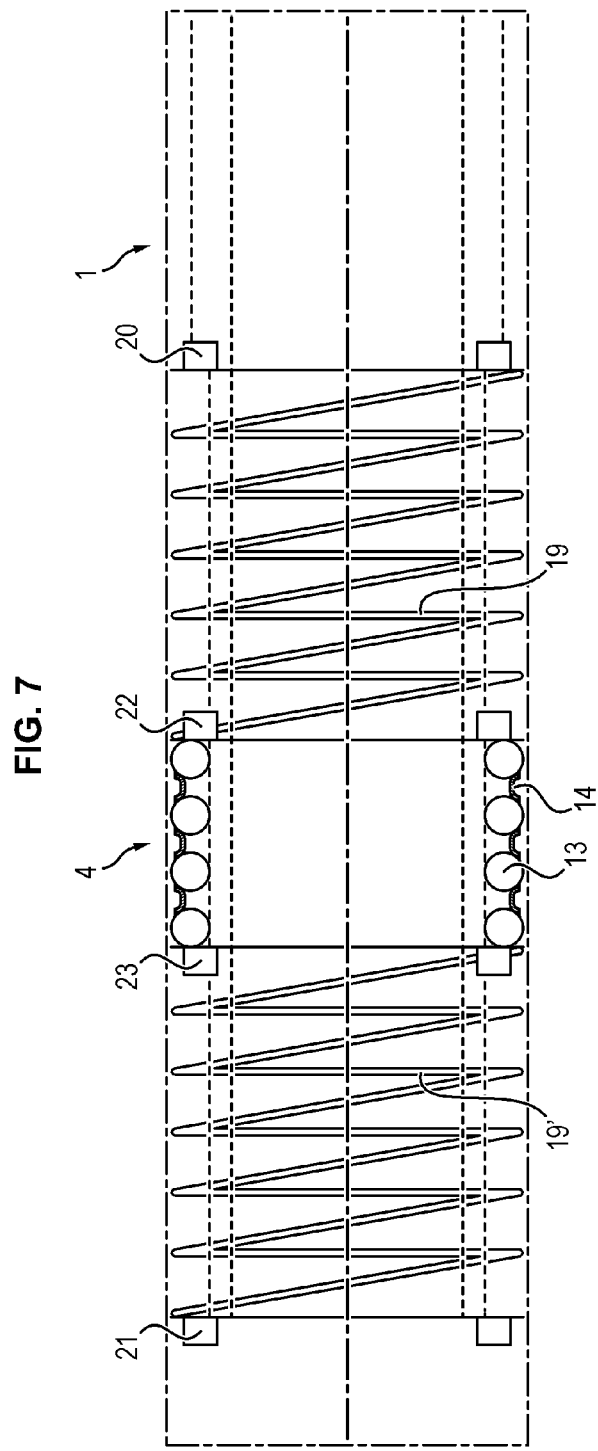

TORQUE TRANSMISSION DEVICE WITH REDUCED FRICTION

CROSS REFERENCE TO RELATED APPLICATIONS

This application is a National Stage of International Application No. PCT/FR2019/051098 filed May 15, 2019, claiming priority based on French Patent Application No. 1854044 filed May 15, 2018, the entire contents of each of which are herein incorporated by reference in their entireties.

GENERAL TECHNICAL FIELD AND PRIOR ART

The invention belongs to the technical field of power transmission elements, and more particularly to the transmission of torque and of a rotating movement between two shafts, particularly in a turbomachine.

In mechanical systems like those shown schematically in FIG. 1, comprising two or more shafts driven in rotation along a longitudinal axis X, it is sometimes necessary, for reasons of mechanical strength of the system, that a degree of freedom in longitudinal translation exist between an engine shaft, here a first shaft 1 mounted in rotation on a chassis 3, and a driven shaft, here a second shaft 2 mounted in rotation and in translation relative to the chassis 3, and mounted in translation relative to the first shaft 1.

Conventional solutions, such as splined couplings, allow the transmission of large torques between a first shaft 1 and a second shaft 2 while allowing relative axial translation of the shafts.

Solutions of this type have, however, the disadvantage of including large surface areas in contact, generating non-negligible friction during axial movement of a shaft relative to the other when the transmitted torque is high.

Besides the energy loss that this friction causes, causing local heating of the parts and a decrease in efficiency of power transmission from one shaft to the other, until it prevents the relative movement of the first shaft 1 and of the second shaft 2.

This damping can have a detrimental effect on the vibration behavior of the system.

In fact, this phenomenon of variable resisting force on a supposed degree of freedom of the system modifies the stiffness of the system, and thus shifts the natural modes of vibration of the system relative to the natural modes of a model in which the energy is transmitted without losses.

The shifting of the natural modes can cause the frequency of these natural modes to approach the frequencies of the harmonics of the vibrations generated by the system in operation.

The dissipation of energy by the system can be altered by it, and thus cause the system to vibrate significantly, leading to a degradation of the system and possibly causing the destruction by fatigue of an element of the system.

These problems are particularly critical in a turbomachine, particularly as regards the coupling of the different portions of a shaft allow transmission of power between different elements. In fact, in the case in which the shaft is divided into different portions, it is necessary to achieve coupling to transmit movement between the different parts of the shaft.

Therefore, there exists a need to limit the potential energy losses of a mechanical connection transmitting rotary power from one shaft to another, particularly when the power levels present involve large torques.

GENERAL PRESENTATION OF THE INVENTION

The invention has as its object to limit the energy losses of a mechanical connection transmitting rotary power, particularly between a low-pressure shaft of a turbomachine and a fan shaft of a turbomachine.

Another object of the invention is to allow the transmission of large torques while ensuring relative translation movement between two elements.

Another object of the invention is to limit the impact of the transmission on the vibration behavior of the system, particularly when it is subjected to large vibration loads.

To this end, the invention proposes a turbomachine including a casing, a low-pressure shaft mounted in rotation in the casing, a fan shaft mounted in rotation relative to the casing and a coupling assembly, the low-pressure shaft being configured to drive the fan shaft in rotation by means of the coupling assembly, the coupling assembly including:
- a first shaft which extends along an axis integral with one among the low-pressure shaft and the fan shaft, the first shaft comprising at least one first portion having an outer face in which are formed a plurality of first axial grooves,
- a second shaft coaxial with the first shaft and integral with one among the low-pressure shaft and the fan shaft, the second shaft comprising at least one second portion with surrounds the first portion and has an inner face in which are formed a plurality of second axial grooves,
- a coupling device including a plurality of rolling elements and an annular cage, said cage being positioned between the first shaft and the second shaft, a plurality of recesses being formed in the cage, each of the rolling elements being positioned on the one hand in a respective recess and on the other hand between one of the first axial grooves and one of the second axial grooves so as to couple in rotation the first and the second shaft, and in which each first and second groove has a first and a second substantially planar surface extending along the axis, the first and the second surfaces being inclined relative to one another.

In this manner, the rolling elements allow forming obstacles by cooperating with the grooves so as to transmit the torque from one shaft to the other, while still allowing rolling in the grooves and thus ensuring a translation movement between the shafts during which friction is strongly limited.

The energy losses of the mechanical connection thus formed are therefore strongly limited.

The vibration behavior of the system is preserved.

Optionally but advantageously, the invention can be completed by the following characteristics, taken alone or in combination:
- each rolling element is mounted free in rotation in its respective recess;
- the recesses of the cage are axially aligned so as to form a series of axial rows, the axial rows being distributed angularly in regular fashion around the axis so that each row extends along a first axial groove and a second axial groove;
- the rolling elements comprise balls;

the coupling device is movable in translation along the axis;

the assembly also comprises a first return element extending between the cage and one among the first shaft and the second shaft, the first return element being configured to define the axial position of the cage relative to one among the first portion and the second portion;

said one among the first portion and the second portion has a first axial abutment, the cage having a second axial abutment, the first return element being supported on each of these axial abutments;

the assembly also comprise a second return element extending between the cage and the portion among the first portion and the second portion which has the first abutment, the second return element being configured to define the axial position of the cage relative to said portion among the first portion and the second portion which has the first abutment;

the portion among the first portion and the second portion which has the first abutment also has a third abutment, and the cage also has a fourth abutment, the second return element being supported on the third abutment and the fourth abutment;

the first return element and the second return element extend on either side of the cage;

the low-pressure shaft includes a turbine portion attached to the low-pressure turbine and a rear abutment portion attached axially to the casing of the turbomachine and guided in rotation relative to the casing, the turbine portion and the rear abutment portion being coupled by means of a splined coupling.

PRESENTATION OF THE FIGURES

Other features and advantages of the invention will still be revealed by the description that follows, which is purely illustrative and not limiting, and must be read with reference to the appended figures in which:

FIG. 3 is a section profile view of an assembly conforming to the invention;

Figure 6A:
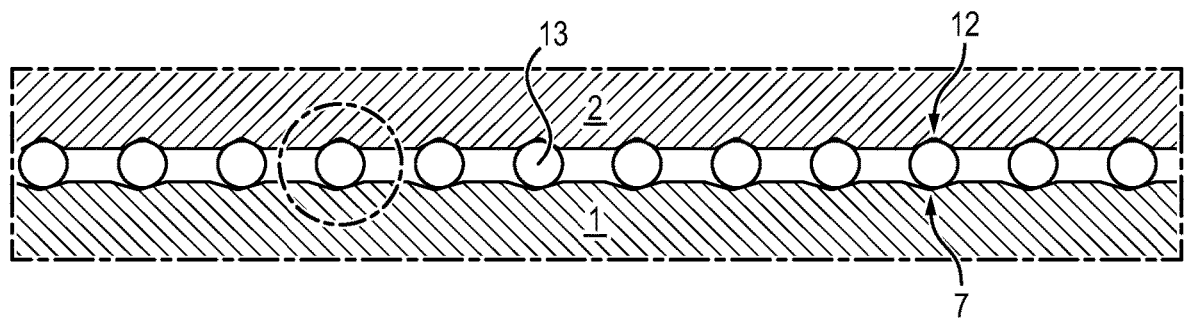
Figure 6B:
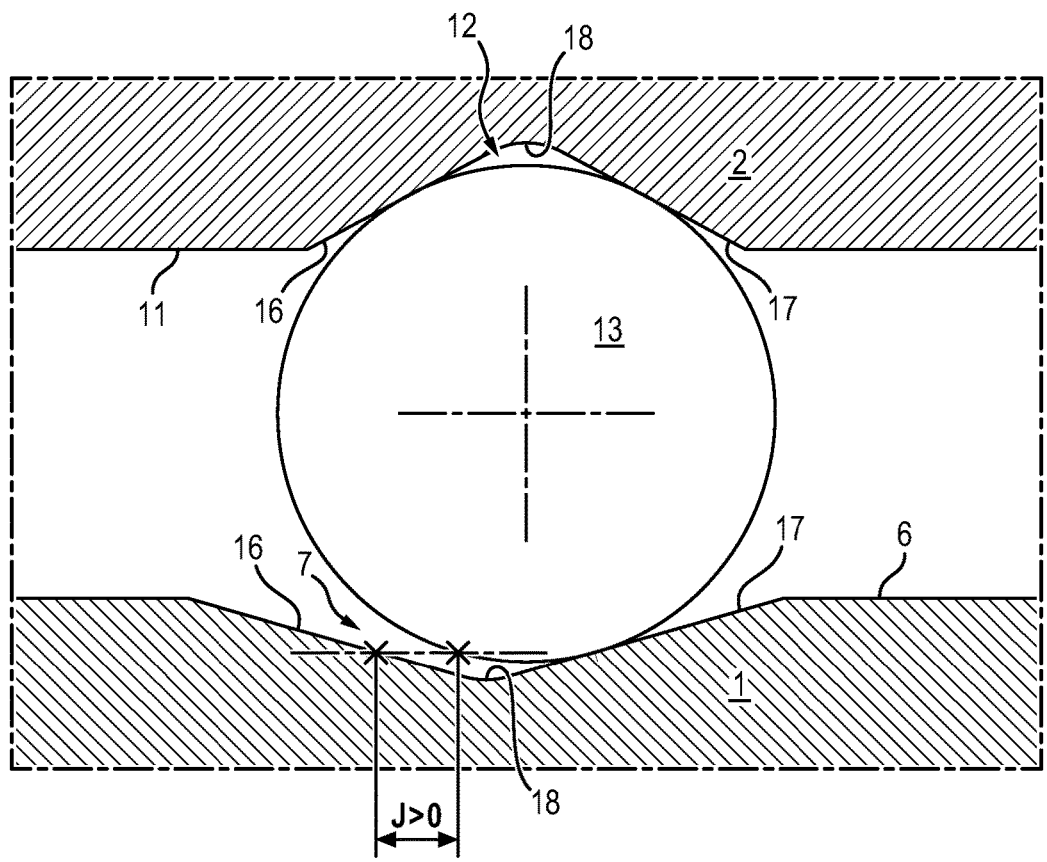
Figure 8:
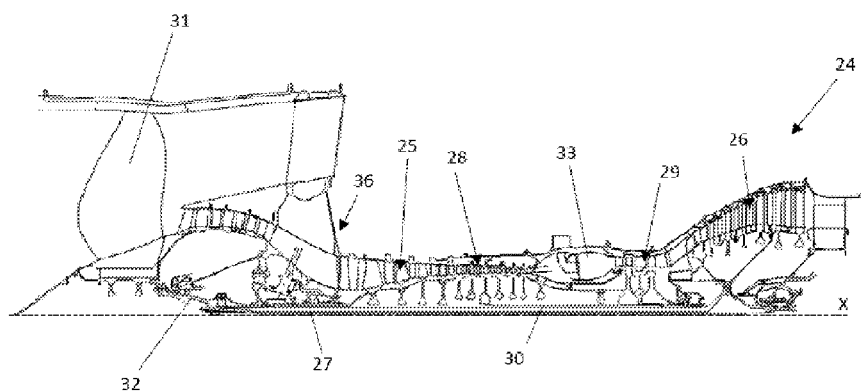
Figure 9:
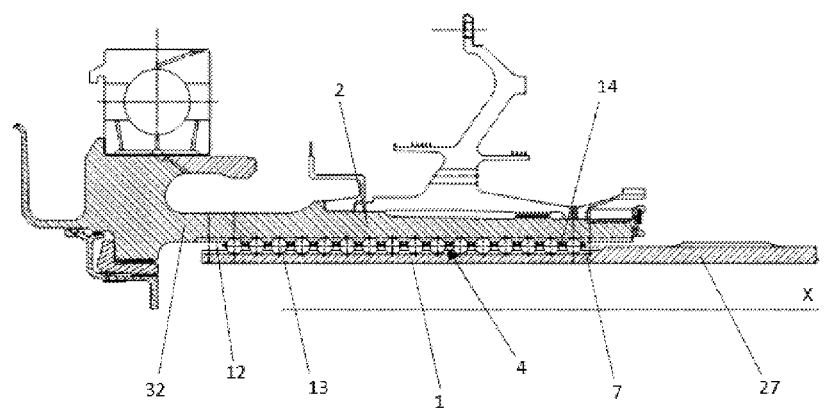
Figure 10:
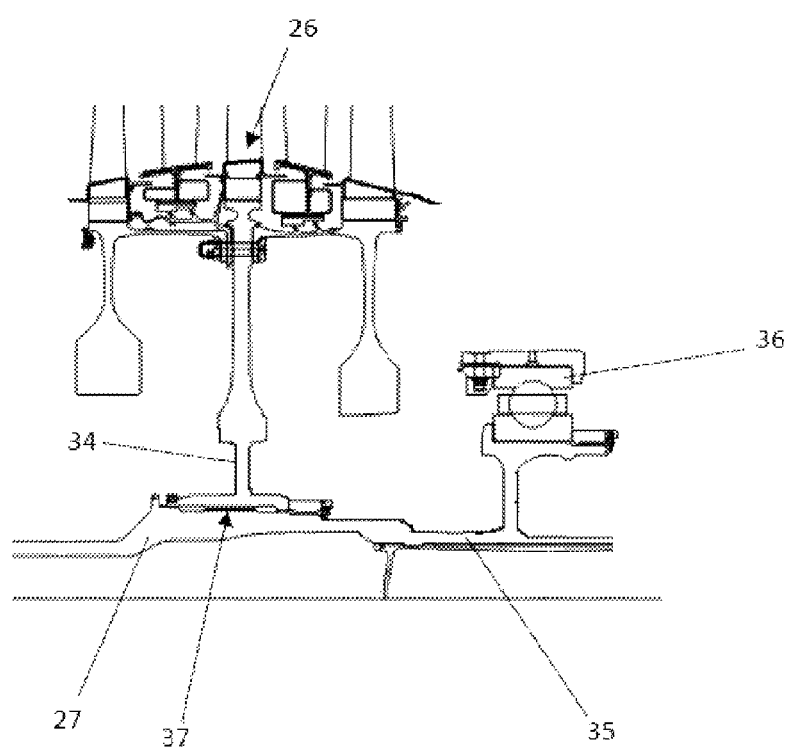

FIG. 6 is a developed view of a frontal section of an assembly conforming to the invention, highlighting the relative position of a first groove, a second groove and an obstacle element during the driving of one shaft by the other; more particularly FIG. 6*a* shows a plurality of obstacle elements comprised between a developed internal portion and a developed external portion; FIG. 6*b* shows in detail the placement of an obstacle element relative to a first groove and a second groove during driving;

FIG. 7 is a schematic profile view showing an embodiment of an assembly conforming to the invention;

FIG. 8 is an assembly figure of a turbomachine according to the invention;

FIG. 9 is a detail view of the coupling between the low-pressure shaft and the fan shaft of a turbomachine according to the invention;

FIG. 10 is a detail view of the coupling between the turbine portion and the rear abutment portion of the low-pressure shaft of a turbomachine according to the invention.

DESCRIPTION OF ONE OR MORE IMPLEMENTATION MODALITIES AND EMBODIMENTS

The invention can apply to any mechanical system including a first rotating shaft and a second rotating shaft, for example in a turbomachine in which a transmission shaft is divided into several portions coupled to one another by means of a coupling assembly.

Figure 1:
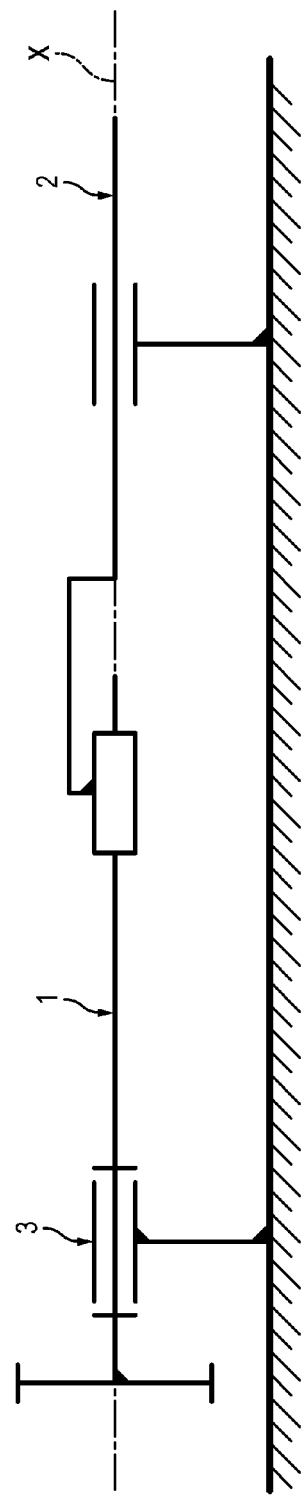
FIG. 1 is a kinematic schematic of a system conforming to the prior art.

A coupling assembly is shown schematically in FIG. 1 and comprises:
- a first rotating shaft 1 comprising at least one first portion 5 having an axis of revolution X, said first portion 5 having an outer face 6 in which are formed a plurality of first axial grooves 7,
- a second shaft 2 comprising at least a second portion 8 having an inner face 11 in which are formed a plurality of second grooves 12, said second shaft 2 being coaxial with the first shaft 1 and
- a coupling device 4 configured to allow power transmission between the first shaft 1 and the second shaft 2.

In the present application, the axis of revolution of the first shaft 1 is called the axis X of rotation of the first rotating shaft 1. The axial direction corresponds to the direction of the axis X of the first shaft 1, and a radial direction is a direction perpendicular to this axis and passing through it. Likewise, an axial plane is a plane containing the axis X and a radial plane is a plane perpendicular to this axis X and passing through it. The tangential direction is a direction perpendicular to the axis X and not passing through it. The circumferential direction is a direction which extends around the axis X. Unless otherwise stated, inner and outer, respectively, will be used with reference to a radial direction so that the inner (i.e. radially inner) portion or face of an element is closer to the axis X than the outer (i.e. radially outer) portion or face of the same element.

Figure 2:
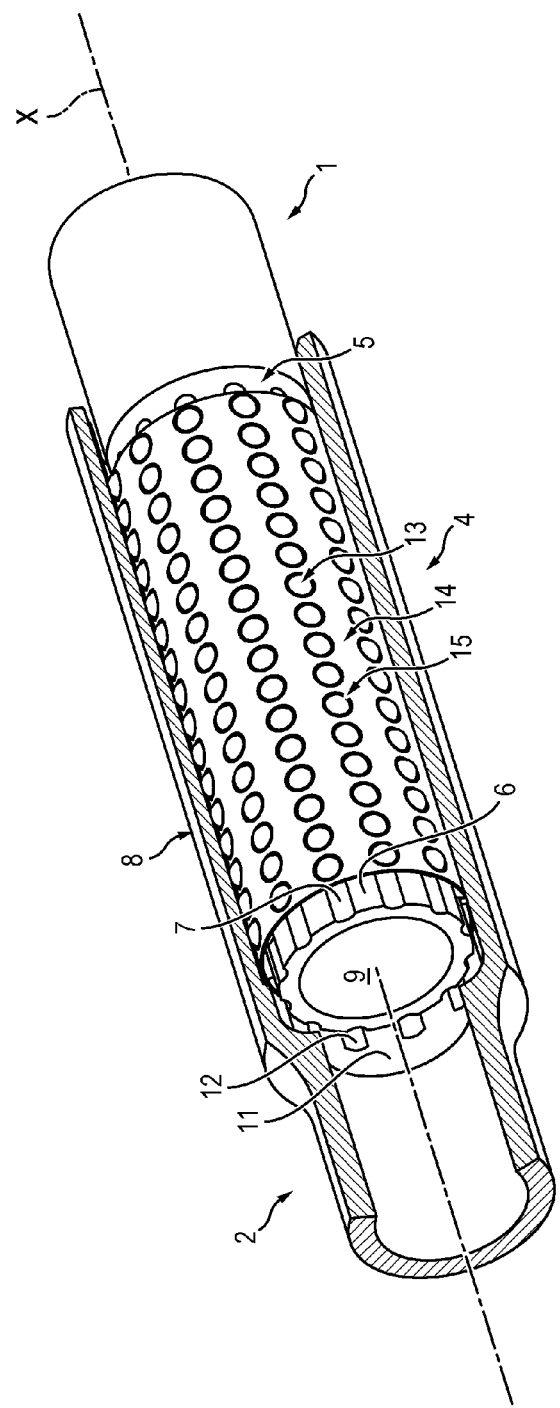
FIG. 2 is a partial section view in perspective of a mechanical assembly conforming to the invention.

FIG. 2 illustrates an embodiment in which the first shaft 1 is coaxial with the axis of revolution X of the first portion 5.

The second shaft 2 comprises a second portion 8 extending along the axis of the first portion 5 and having a substantially cylindrical cavity 9 configured to receive the first portion 5 of the first shaft 1.

In the embodiment illustrated, the second shaft 2 and the second portion 8 extend along the axis X. However, as a variant, the second portion 8 can extend along an axis parallel to the axis of the second shaft 2.

The coupling device 4 includes a plurality of rolling elements 13 and a substantially cylindrical cage 14.

The cage 14 extends between the first portion 5 of the first shaft 1 and the second portion 8 of the second shaft 2 so that it is comprised radially between the outer face 6 and the inner face 11.

Moreover, a plurality of recesses 15 is formed in the cage 14. The rolling elements 13 are each positioned, on the one hand, in a respective recess 15 and on the other hand between one of the first axial grooves 7 and one of the second axial grooves 12 so as to transmit a tangential force from one among said first groove 7 and said second groove 12 to the other among said first groove 7 and said second groove 12.

The rolling elements 13 can comprise rollers and/or balls. They ensure the transmission of the torque by obstacle between the first shaft 1 and the second shaft 2 and allow eliminating direct contact between the first shaft 1 and the second shaft 2.

In this manner, friction is strongly reduced during relative axial movement of the first shaft 1 and the second shaft 2, which allows relative axial movement of the first shaft 1 and of the second shaft 2 even when large torques are transmitted from one shaft to another.

This also allows reducing the dissipation of energy by friction, and therefore improving the efficiency of power transmission, and limiting the variations of stiffness of the mechanical connection and therefore of the assembly.

This therefore allow limiting the shifting of the natural modes of the assembly and limits the risk of appearance of resonant phenomena. The lifetime and the reliability of the assembly are consequently considerably increased.

In one embodiment, each rolling element 13 is free in its respective recess 15 of the cage 14 so as to be able to freely move in translation in the first axial groove 7 and in the corresponding second axial groove 12. This embodiment allows further reduction of friction in the case of axial movement, and therefore further increases the lifetime and the reliability of the assembly.

The recesses 15 are configured to position the rolling elements 13 relative to one another, which allows in particular avoiding the rolling elements 13 being in contact with one another.

The recesses 15 of the cage 14 thus allow avoiding friction between the rolling elements 13, causing energy losses, and which could lead to the blocking of certain rolling elements 13 leading to a degradation of the coupling assembly.

In the embodiment illustrated in FIG. 3, the rolling elements 13 are distributed axially in a regular spacing.

This therefor allows axial distribution of the rolling elements 13 along the first 7 and second 12 grooves, so as to distribute the points of contact on a wider area and to limit the level of local loads in the first portion 5 and the second portion 8.

In particular, this allows minimizing the fatigue of the rolling elements 13, of the first 7 and second 12 grooves and thus increasing the lifetime of the coupling assembly.

Figure 4:
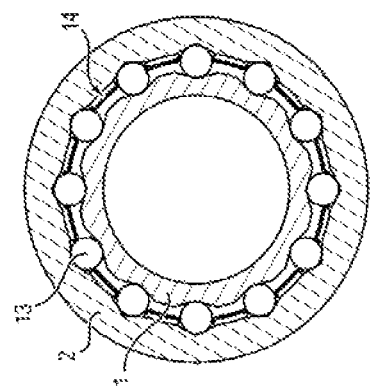
FIG. 4 is a section front view of an assembly conforming to the invention.

FIG. 4 illustrates the angular distribution, around the axis X, of the first 7 and second 12 grooves, of the rolling elements 13 and consequently of the recesses 15.

The angular pitch p between two adjacent second grooves 12 is constant, and identical to the angular pitch between two adjacent first grooves 7, likewise for two adjacent rolling elements 13 and two adjacent rows of recesses 15.

In this manner, the distribution of loads in the first portion 5 and the second portion 8 is optimized and allows limiting the peaks of the loads.

Figure 5:
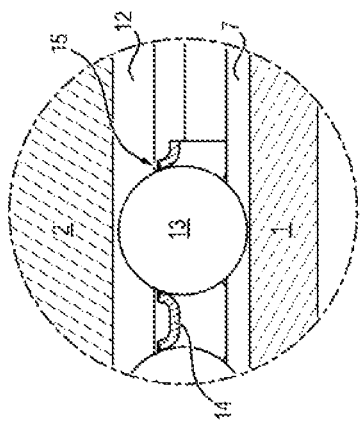
FIG. 5 is a detail view of the assembly of an obstacle element in an embodiment of an assembly conforming to the invention.

In the detail view illustrated in FIG. 5, a ball is set in position by a recess 15 of the cage 14, the cage 14 being configured to retain the rolling elements 13 in position relative to one another, as well as to retain them in position against the first portion 5, inside the cage 14.

In a variant that is not shown, the cage 14 is configured to retain the rolling elements 13 in position against the second portion 8 outside the cage 14.

The cage 14 therefore allows in particular facilitating the assembly of the rolling elements 13 on one of the shafts before bringing the first shaft 1 and the second shaft 2 into their relative positions.

FIG. 6a illustrates the relative tangential position of the rolling elements 13, of the first grooves 7 and of the second grooves 12 when torque is transmitted by the first shaft 1 to the second shaft 2. In FIG. 6a, an angular portion of a straight section of the assembly is shown as developed along a straight line.

A detail of a configuration of this type is illustrated in FIG. 6b. A first groove 7, in the same manner as a second groove 12, includes a first 16 and a second 17 planar surface extending longitudinally.

The first surface 16 and the second surface 17 are inclined relative to one another and join together while forming a groove bottom 18. A groove 7, 12 thus forms, in this preferred embodiment, a dihedral of which the apex angle allows transmitting tangential forces to the corresponding rolling element 13 regardless of the direction of rotation of the first shaft 1 or of the second shaft 2.

In other embodiments, not shown, the number of surfaces forming a groove 7, 12 can be greater, for example 3 or 4, so as to form a trough housing the rolling elements 13.

Thanks to the first and second surfaces 16, 17 inclined relative to one another, a tangential force can be transmitted between the first 1 and the second 2 shaft in both directions, allowing transmission of torque (or power) regardless of the direction of rotation of the shafts.

The dimensions of a rolling element 13 and the positioning of a second groove 12 relative to a first groove 7 are configured to provide radial and tangential clearance to the rolling element 13. In this manner, the blocking of a rolling element between a second groove 12 and a first groove 7 is avoided, particularly during the relative axial movement of the first shaft 1 and of the second shaft 2.

In addition, this allows reducing the number of points of contact between the rolling element 13 and the grooves when torque is transmitted, and thus reducing friction between the rolling element 13 and the grooves 7, 12. In fact, a rolling element 13 being positioned between two grooves 7, 12, an absence of radial and tangential clearance of the rolling element 13 would imply that it had two points of contact with a first groove 7, and two points of contact with a second groove 12.

In the case shown, the rolling element 13 has only one point of contact with the first groove 7 and has two points of contact with the second groove 12. In fact, during operation, the centrifugal force applied to the rolling elements 13 pushes them into contact with the radially outer groove, here the second groove 12. The three contact points thus prevent any relative movement in the tangential direction between the rolling element 13 and the grooves 7, 12.

Thus, force is transmitted from one surface of a first groove 7 to a surface of a second groove 12, thus accomplishing the transmission of torque from one shaft to the other.

In a variant, not shown, a rolling element 13 has only a single point of contact with a first groove 7 and one point of contact with a second groove 12, particularly when the torque transmitted is sufficiently large, despite the centrifugal force applied to the rolling element 13, to move the rolling element 13 tangentially in an over-center position in a tangential direction between a first surface 16 of one among a first groove 7 and a second groove 12 and a second surface 17 of the other among the first groove 7 and the second groove 12.

In this manner, friction is further reduced, and this also allows facilitating the relative movement of the first shaft 1 and of the second shaft 2 when a large torque is transmitted.

In one variant, not shown, the diameter of the outer face 6 of the first portion 5 and the diameter of the inner face 11 of the second portion 8 are configured so as to cooperate with the smallest positive clearance, allowing centering between the two shafts.

The grooves of the rolling element 13 are also configured so as to prevent the rolling element 13 from leaving the first groove 7 or the second groove 12. To this end, the distance in a radial direction between the inner face 11 and the outer face 6 is less than the diameter of a rolling element 13.

Depending on the torque to be transmitted by the coupling device 4, the number and the characteristics of the rolling elements 13 can vary, particularly in order to limit the Hertz pressures and avoid plastic deformation of the rolling elements 13.

During the driving of one shaft by the other, the translation movements of the shafts can cause successive translations of the cage 14.

When these successive translations bring the cage 14 to one of the ends of the grooves 7, 12, rolling elements 13 can become blocked between the first shaft 1 and the second shaft 2, or leave their respective recesses 15 and grooves 7, 12, which can cause degradation of the coupling device 4.

In one embodiment, a first return element 19 extends between the cage 14 and one among the first portion 5 and the second portion 8, said first return element 19 being configured to move the cage 14 axially relative to the portion on which the return element is supported.

To this end, the portion among the first portion 5 and the second portion 8 has a first axial abutment 20, the cage 14 having a second axial abutment 22, and the first return element 19 is supported on the first abutment 20 and the second abutment 22.

When the return element 19 is compressed, it can therefore develop a thrust force on the cage 14 and move said cage 14.

This allows avoiding the rolling elements 13 moving axially until one of the ends of the grooves 7, 12 and causing the degradation of the coupling device 4.

In one variant, the return element 19 is attached to the first abutment 20 and the second abutment 21. In this manner, the return element 19 can operate in compression and in tension and cause movement of the cage 14 in two opposite directions. This allow returning the cage 14 regularly to a predefined axial position which allows optimal operation of the coupling device 4.

During driving, the torque transmitted generates a large clamping force from the first portion 5 and from the second portion 8 on the rolling elements 13. During clamping of the rolling elements 13 by the first 5 and second 8 portion, said rolling elements 13, and therefore incidentally the cage 14, can only move relative to the portions 5, 8 if said portions 5, 8 are moving relative to one another.

When the transmitted torque is reduced, and incidentally the clamping force applied to the rolling elements 13 is reduced, for example during a transition in the torque or a deceleration, tangential clearance appears between the rolling elements 13 and the grooves 7, 12 and allows the return element 19 to replace the cage 14 in the predetermined position relative to the portion among the first portion 5 and the second portion 8 which has the first abutment 20.

In an embodiment shown in FIG. 7, the coupling device 4 also includes a second return element 19'.

The portion among the first portion 5 and the second portion 8 which has the first abutment 20 also has a second abutment 21.

The cage also has a fourth abutment 23.

The first return element 19 is supported, on the one hand, on the first abutment 20 and on the other hand on the second abutment 22, the second return element 19' being supported on the one hand on the third abutment 21 and on the other on the fourth abutment 23.

In this manner, the axial position of the cage 14 relative to the first shaft 1 is constrained to an optimal position. It is not necessary to attach the return element to abutments, each return element 19, 19' being able to work in compression, which facilitates assembly and manufacture.

The force developed by the two return elements 19, 19' is also greater than the force developed by a single return element and allows returning the cage 14 into position more rapidly and accurately.

A turbomachine 24 illustrated in FIG. 8 includes a low-pressure body and a high-pressure body.

The low-pressure body includes a low-pressure compressor 25, a low-pressure turbine 26 and a low-pressure shaft 27 configured to transmit power from the low-pressure turbine 26 to the low-pressure compressor 25, the high-pressure body including a high-pressure compressor 28, a high-pressure turbine 29 and a high-pressure shaft 30 configured to transmit power from the high-pressure turbine 29 and the high-pressure compressor 28.

In the embodiment shown, the low-pressure body drives in rotation a fan body including a fan 31 mounted fixed on a fan shaft 32.

A flow of air circulates in the turbomachine and passes, from upstream to downstream, the fan 31, the low-pressure compressor 25, the high-pressure compressor 28, a combustion chamber 33, the high-pressure turbine 29 then the low-pressure turbine 26.

The low-pressure shaft 27 drives in rotation the fan shaft 32 by means of a coupling assembly as previously described. The coupling device 4 is thus disposed between the low-pressure shaft 27 and the fan shaft 32.

In the embodiment shown in FIG. 9, the fan shaft 32 can be likened to the second shaft 2 and has a plurality of second grooves 12 formed on its inner face 11, the fan shaft 27 being likened to the first shaft 1 and having a plurality of first grooves 7 formed on its outer face 6.

In one variant, the fan shaft 32 can be likened to the first shaft 1 and the low-pressure shaft 27 can be likened to the second shaft 2.

In the embodiment shown in FIG. 10, the low-pressure shaft 27 is segmented into several portions, and comprises in particular a turbine portion 34 attached to the low-pressure turbine 26 and a rear abutment portion 35 attached axially to the casing 36 of the turbomachine and guided in rotation relative to the casing 36 of the turbomachine.

A splined coupling 37 is accomplished between the turbine portion 34 and the rear abutment portion 35. A coupling of this type has a high temperature tolerance, which allows this coupling to retain its mechanical characteristics and its reliability even if it rises in temperature.

The use of a splined coupling between the turbine portion 34 and the rear abutment portion 35 therefore allows retaining the mechanical characteristics of the coupling despite its positioning in proximity to and in contact with hot parts, particularly the low-pressure turbine 26 through which hot gases at high temperature transit.

The invention claimed is:

1. A turbomachine including a casing, a low-pressure shaft mounted in rotation in the casing, a fan shaft mounted in rotation relative to the casing and a coupling assembly, the low-pressure shaft being configured to drive the fan shaft in rotation by means of the coupling assembly, the coupling assembly including:

a first shaft which extends along an axis and integral with one among the low-pressure shaft and the fan shaft, the first shaft comprising at least a first portion having an outer face in which are formed a plurality of first axial grooves, a second shaft coaxial with the first shaft and integral with one among the low-pressure shaft and the fan shaft, the second shaft comprising at least one second portion which surrounds the first portion and has an inner face in which are formed a plurality of second axial grooves, a coupling device including a plurality of rolling elements and a cage that is annular, said cage being positioned between the first shaft and the second shaft, a plurality of recesses being formed in the cage, each of the rolling elements being positioned in a respective recess and between one of the first axial grooves and one of the second axial grooves so as to couple in rotation the first and the second shaft, dimensions of one of the rolling elements and the positioning of one of the second axial grooves relative to one of the first axial grooves being configured to supply a radial and tangential clearance to one of the rolling elements, and in which each first and second groove has a first and a second substantially planar surface extending along the axis, wherein, within each of the first and second groove, the first and the second surfaces are inclined relative to one another.

2. The turbomachine according to claim 1, wherein each rolling element is mounted free in its respective recess.

3. The turbomachine according to claim 1, wherein the recesses of the cage are axially aligned so as to form a series of axial rows, the axial rows being distributed angularly in regular fashion around the axis so that each row extends along a first axial groove and a second axial groove.

4. The turbomachine according to claim 1, wherein the rolling elements comprise balls.

5. The turbomachine according to claim 1, wherein the coupling device is movable in translation along the axis.

6. The turbomachine according to claim 1, wherein the coupling assembly further comprises a first return element extending between the cage and one among the first shaft and the second shaft, the first return element being configured to define an axial position of the cage relative to one among the first portion and the second portion.

7. The turbomachine according to claim 6, wherein one among the first portion and the second portion has a first axial abutment, the cage having a second axial abutment, the first return element being supported on each of the first axial abutment and the second axial abutment.

8. The turbomachine according to claim 1, comprising a second return element extending between the cage and a portion among the first portion and the second portion which has a first axial abutment, the second return element being configured to define an axial position of the cage relative to said portion among the first portion and the second portion which has the first axial abutment.

9. The turbomachine according to claim 8, wherein the portion among the first portion and the second portion which has the first axial abutment also has a third abutment, and the cage also has a fourth abutment, the second return element being supported on the third abutment and the fourth abutment.

10. The turbomachine according to claim 6, further comprising a second return element extending between the cage and a portion among the first portion and the second portion which has a first axial abutment, the second return element being configured to define the axial position of the cage relative to said portion among the first portion and the second portion which has the first axial abutment, wherein the first return element and the second return element extend on either side of the cage.

11. The turbomachine according to claim 1, wherein the low-pressure shaft includes a turbine portion attached to a low-pressure turbine and a rear abutment portion attached axially to the casing of the turbomachine and guided in rotation relative to the casing, the turbine portion and the rear abutment portion being coupled by means of a splined coupling.

* * * * *